United States Patent [19]  
Sylvest

[11] 3,839,058  
[45] Oct. 1, 1974

[54] METHOD FOR MANUFACTURING CEMENT CLINKER

[75] Inventor: Karl Jens Sylvest, Copenhagen-Valby, Denmark

[73] Assignees: Aktieselskabet Niro Atomizer, Copenhagen, Denmark; F. L. Smidth & Co., Creskill, N.J.

[22] Filed: Apr. 25, 1972

[21] Appl. No.: 247,324

[30] Foreign Application Priority Data  
May 5, 1971 Great Britain.................... 13314/71

[52] U.S. Cl. ............................................. 106/100
[51] Int. Cl. ......................... C04b 7/02, C04b 7/36
[58] Field of Search..................................... 106/100

[56] References Cited  
UNITED STATES PATENTS

| | | | |
|---|---|---|---|
| 3,254,882 | 6/1966 | Helming............................. | 106/100 |
| 3,498,594 | 3/1970 | Rikhof................................ | 106/100 |
| 3,716,387 | 2/1973 | Simmons et al. .................. | 106/100 |

Primary Examiner—James E. Poer  
Attorney, Agent, or Firm—Pennie & Edmonds

[57] ABSTRACT

Method and apparatus is disclosed for manufacturing cement clinker in a rotary kiln system wherein the smoke gas velocity through the rotary kiln is advantageously increased to cause a quantity of pulverulent material to be entrained in the smoke gases which is significantly larger than heretofore considered desirable.

6 Claims, 1 Drawing Figure

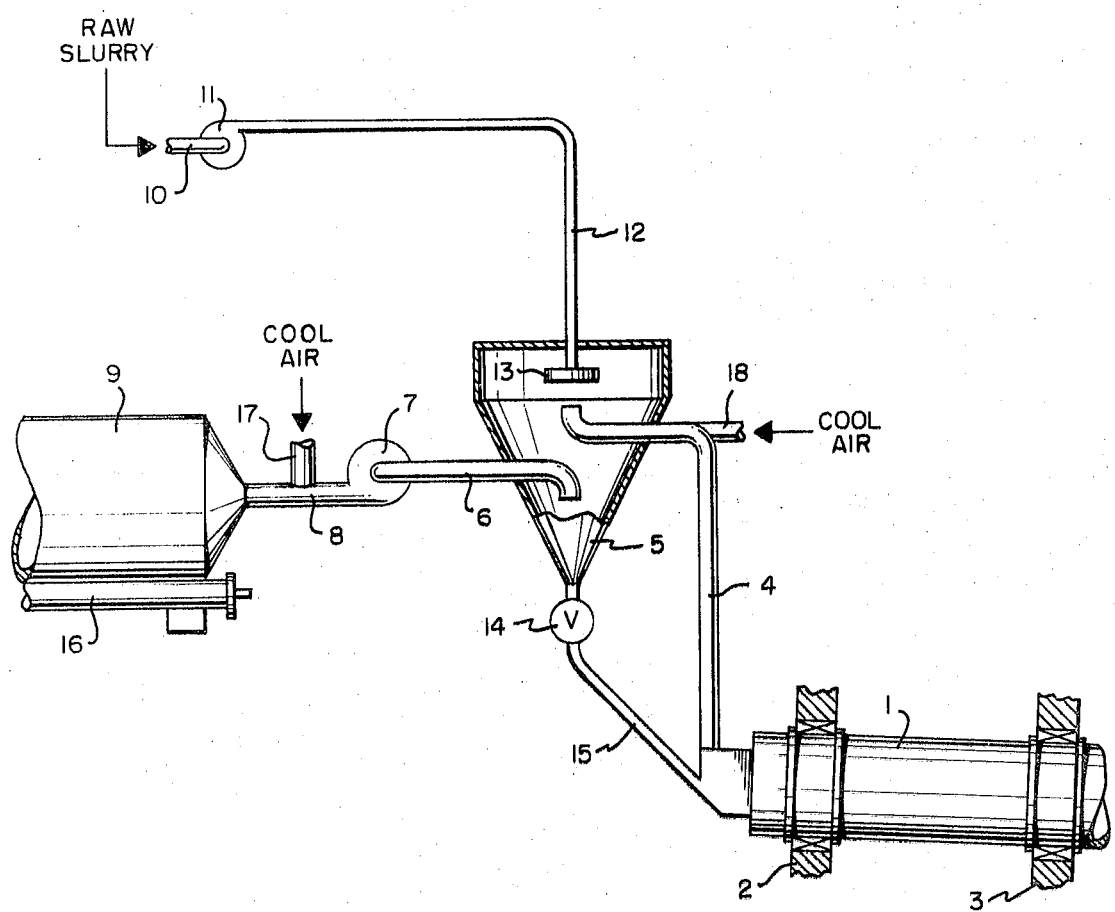

METHOD FOR MANUFACTURING CEMENT CLINKER

BACKGROUND OF THE INVENTION

When cement clinker, which is an intermediate product obtained in cement manufacture, is manufactured in a rotary kiln plant, it is usual to distinguish between the dry and the wet method using a dry kiln and a wet kiln, respectively. In the former case the raw materials are fed to the rotary kiln in their dry state, usually as a powder termed raw meal, and in the latter case as an aqueous suspension, termed raw slurry, usually containing 30–40% water by weight. The method found preferably in any given case depends upon circumstances.

With the use of the dry method a separate so-called raw meal preheater is often provided in front of the rotary kiln, and the raw meal preheater is then said to constitute an integral part of a dry kiln plant and a part of the heat contained in the smoke gases from the rotary kiln is then utilized in the raw meal preheater for effectively preheating the raw meal before it is introduced into the rotary kiln to be burnt to cement clinker.

Similarly with the use of the wet method a separate so-called slurry dryer is sometimes provided in front of the rotary kiln, the slurry dryer then constituting an integral part of a wet kiln plant and utilizing a part of the heat contained in the rotary kiln gases for converting by effective drying the cement raw slurry into pulverulent cement raw material which is then introduced into the rotary kiln. It will be appreciated that in these circumstances the rotary kiln may with some justification be described as a dry kiln since it receives the raw material in its dry state, although the starting material for the manufacture of cement clinker is cement raw slurry.

The slurry dryer used may advantageously be a suspension dryer in which the slurry is brought into a finely divided state and dried in suspension in the hot rotary kiln smoke gases. A special kind of suspension dryer, known as a spray dryer, has in particular been found advantageous.

The use of dry kilns in general involves a drawback which is usually, though with only partial justification, described as dust circulation. It manifests itself in that a part of the finest particles present in the rotary kiln at any time will be carried out of the kiln, entrained in the kiln smoke gases, and later be re-introduced into the kiln. Part of these dust particles consist of unburned particles of fuel, fuel ashes and very fine raw material particles. The remaining part is constituted by larger particles of material which may be uncalcined or more or less calcined and which do not constitute actual dust. If the kiln is associated with a separate preheater for the cement raw material, most of these dust particles will be precipitated in the preheater as "dust" and become mixed with the fresh preheated raw material before being reintroduced into the kiln. A certain amount of "dust" will thus be circulating in the closed circuit consisting of kiln, smoke gas pipe, preheater and feeding pipe for raw material to the kiln.

This dust circulation has heretofore been considered highly injurious since it reduces the heat economy of the kiln because a part of the heat contained in the "dust" is wasted during the circulation outside the kiln. Furthermore, a portion of the dust itself which leaves the kiln is wasted entirely. That is, it does not return to the kiln, but leaves the preheater together with the cooled smoke gases and is passed to the dust precipitator, preferably an electrostatic dust precipitator, with which every present-day rotary kiln plant is usually euipped. Another drawback is therefore that the dust precipitator has to be larger than would have been necessary had no such large amount of dust been carried out of the kiln.

Some dust circulation is inevitable, and various methods have been tried to keep it within reasonable limits, for example, by ensuring a smoke gas flow of reasonable velocity through the kiln. The rate at which this flow should be maintained depends upon many factors including, among others, the size and load of the kiln and the nature of the raw materials.

To give some idea of the normal operating conditions it may be mentioned by way of example that in a dry kiln having an output of about 1,000 tons of clinker per 24 hours a velocity of the smoke gas through the kiln of 6–8 m/sec. is common. This may be assumed to give a dust circulation of 130–150%, which means that 30–50% of dust is carried out of the kiln and recirculated so that the kiln is not supplied with a 100% feed, but a feed of 130–150%. Even a dust circulation of this relatively limited amount may be undesirable, but is inevitable in practice for the reasons stated, since a further reduction of the smoke gas velocity involves other drawbacks.

It has now surprisingly been discovered that if the slurry dryer is a suspension dryer or, more particularly, a spray dryer, even a very heavy increase in the dust circulation will, contrary to being a drawback, offer substantial advantages as will be described hereinafter.

SUMMARY OF THE INVENTION

The present invention is thus concerned with a method of manufacturing cement clinker using cement raw slurry as starting material in a rotary kiln plant incorporating a suspension dryer in which the slurry is brought into a finely divided state and dried while suspended in the hot rotary kiln gases so as to be converted into a pulverulent raw material and subsequently fed to the rotary kiln. In accordance with the invention, the smoke gas velocity through the rotary kiln is increased beyond what is normally considered desirable so that the smoke gases on their way to the suspension dryer are deliberately caused to entrain a quantity of pulverulent material substantially larger than hitherto considered desireable. In the preferred embodiment of the invention, the suspension dryer is a spray dryer.

The main advantage of the method according to the invention is that the large concentration of particulate dust material in the smoke gas pipe connecting the kiln with the suspension dryer substantially eliminates undesirable cakings on pipe walls of alkali, chloride and sulphur compounds, which with prior art systems using a suspension dryer are prevalent. These alkali, chloride or sulphur compounds, which are nearly always present in the smoke gases from a cement rotary kiln to a varying extent and which originate from the cement raw materials and from the fuel will, under the teachings of this invention, condense on the many particles of material instead of condensing upon the pipe walls.

Another advantage of this invention is that the large amount of solid dust material suspended or entrained in the smoke gases during the passage through the suspension dryer contains a substantial amount of heat which constitutes a valuable supplement to the heat available from the smoke gas itself. Both these sources of heat are utilized in the spray dryer for evaporating the water contained in the slurry, and the content of a large amount of solid dust material entrained in the gases passing through the suspension dryer substantially increases the efficiency of the dryer. With the spray-type suspension dryer of the preferred embodiment, the dryer efficiency is particularly high because of the fact that spray dried material is readily entrained by the smoke gases to a much greater degree than with other forms of drying.

With the method according to this invention a smoke gas velocity greater than 9 m/sec., is necessary with a smoke gas velocity of 9 – 12 m/sec. being considered optimum. With such velocity, the solid dust particles entrained within the smoke gases constitute from 50 – 200% of the amount fed to the kiln as fresh dry material; and under certain conditions can be even higher.

The invention also includes a plant for manufacturing cement clinker by the method according to the invention.

BRIEF DESCRIPTION OF THE DRAWING

The sole FIGURE shows a cement manufacturing plant according to the invention.

DETAILED DESCRIPTION OF THE INVENTION

Referring to the drawing, 1 designates a rotary kiln of conventional construction wherein only the inlet end for cement raw material is shown. The kiln is rotatable about its longitudinal axis and is supported for such rotation in a conventional manner on foundations 2 and 3.

A smoke gas inlet pipe 4 connects the rotary kiln 1 with a spray dryer 5. In addition to the smoke gases from the kiln, solid pulverulent material or dust suspended or entrained therein passes through smoke gas pipe 4 from the kiln 1 into the spray dryer 5.

The smoke gases leave the spray dryer 5 through a smoke gas outlet pipe 6 at the end of which a smoke gas fan 7 is positioned. The fan 7 produces the suction causing the smoke gases to flow along a path originating at kiln 1 then successively through smoke gas pipe 4, dryer 5 and pipe 6. The fan forces smoke gases extracted by suction into another pipe 8 forming a continuation of the smoke gas pipe 6 and then into an electrostatic dust precipitator 9. Having passed through the precipitator 9 the smoke gases are conveyed into the atmosphere in a well known manner.

The cement raw slurry to be burned to cement clinker in the rotary kiln is fed to the dryer through inlet pipe 10 at the end of which is provided a slurry pump 11. The slurry pump forces the slurry through a feed pipe 12 into contact with a high speed rotatable wheel 13 located at the mouth of the spray dryer 5. The wheel 13 acts to hurl the slurry in a divided form of small drops into the interior of the spray dryer. Here the slurry meets the hot smoke gases on their way from the pipe 4 to the pipe 6. The hot gases dry the slurry drops to a powder which falls to the bottom of the spray dryer. The raw material powder is passed through a gate valve 14 and a feed pipe 15 into the rotary kiln 1.

An extracting worm conveyor 16 operates to remove the dust collected by the dust precipitator. Unless this dust has an excessive content of alkali, chloride or sulphur compounds it may be re-introduced into the kiln, for example through a connecting pipe (not shown) intercommunicating between the worm conveyor and feed pipe 15.

The pipes 17 and 18 serve to introduce cold atmospheric air into the pipes 8 and 4 in cases of emergency.

To increase the precipitation of fresh raw material and dust from the gases an auxiliary cyclone may be inserted in the pipe 6. Solid material precipitated in such a cyclone may join the material conveyed through the pipe 15.

As a frame of reference, with conventional smoke gas velocity of, say, 7 m/sec. a tolerable dust concentration of 140% is obtained. In other words, the velocity of the smoke gas through the kiln 1 is 7 m/sec. and higher in the narrower smoke gas pipe 4. The slurry converted to powder is 100% and the dust carried by the smoke gases in the pipe 4 is 40% of the slurry converted to powder. The feed to the kiln through the pipe 15 is thus 140%, i.e., 100% fresh dry material and 40% dust.

With the method, according to the present invention a smoke gas velocity through the kiln of 11 m/sec. was utilized through a kiln having a clinker output of about 200 t/24 h and a charge of about 12% of the free kiln cross-section. Under such conditions a dust circulation of 220% was obtained. In other words the kiln received, in addition to the fresh dry material an amount in the form of dust material equal to 120% of the fresh dry material.

Also, with the increased smoke gas velocity, the plant exhibited a reduced tendency to build up cakings in the smoke gas pipe and the efficiency of the spray dryer was improved without any occurrence of the hereinbefore described disadvantages normally attributable to an increased smoke gas velocity in the kiln. Thus there was no appreciable heat loss due to the increased dust circulation because most of the heat contained in the circulating dust was utilized on the evaporation of the water in the slurry. Nor was an electrostatic dust precipitator of larger capacity required because the greater part of the dust was caught in the spray dryer and consequently did not enter into the electrostatic precipitator.

I claim:

1. A method of manufacturing cement clinker in a rotary kiln from cement raw slurry comprising; directing hot smoke gases exiting from said rotary kiln to a suspension dryer; feeding the slurry to the suspension dryer and suspending it in the hot smoke gases exiting from the rotary kiln for bringing the slurry into a finely divided state and drying it so as to convert it into pulverulent cement raw material; feeding the pulverulent cement raw material from the suspension dryer to said rotary kiln for manufacturing cement clinker; and maintaining the velocity of hot smoke gases through the kiln at levels sufficient to cause entrainment of pulverulent material in the kiln gases in an amount equal to at least approximately 50% by volume of the amount of fresh cement raw material fed to said rotary kiln.

2. The method of manufacturing cement clinker according to claim 1 wherein the smoke gas velocity through the kiln is maintained at a level greater than 9 meters per second.

3. The method of manufacturing cement clinker according to claim 2 wherein the smoke gas velocity through the kiln is maintained at a level between approximately 9 meters per second and approximately 12 meters per second.

4. The method of manufacturing cement clinker according to claim 3 wherein the smoke gas velocity through the kiln is approximately 11 meters per second and the amount of pulverulent material entrained in the kiln gases is equal to about 120% of the amount of fresh raw material fed to said kiln.

5. The method of manufacturing cement clinker according to claim 3 wherein the smoke gas velocity through the kiln is approximately 11 meters per second and the total dust circulation is approximately 220% of the amount of fresh raw material fed to said kiln.

6. A method of manufacturing cement clinker in a rotary kiln from cement raw slurry comprising: directing hot smoke gases exiting from said rotary kiln to a spray dryer; feeding the slurry to the spray dryer in a manner to bring it into a finely divided state, and suspending said finely divided slurry in the hot gases exiting from the rotary kiln for drying it so as to be converted into pulverulent cement raw material; feeding the pulverulent cement raw material from the spray dryer to said rotary kiln for manufacturing cement clinker; and maintaining the velocity of the hot smoke gases through the kiln between about 9 meters per second and 12 meters per second such that an amount of pulverulent material is caused to be entrained in the kiln gases in an amount greater than about 50% by volume of the fresh raw material fed to the kiln.

* * * * *